Patented Mar. 14, 1933

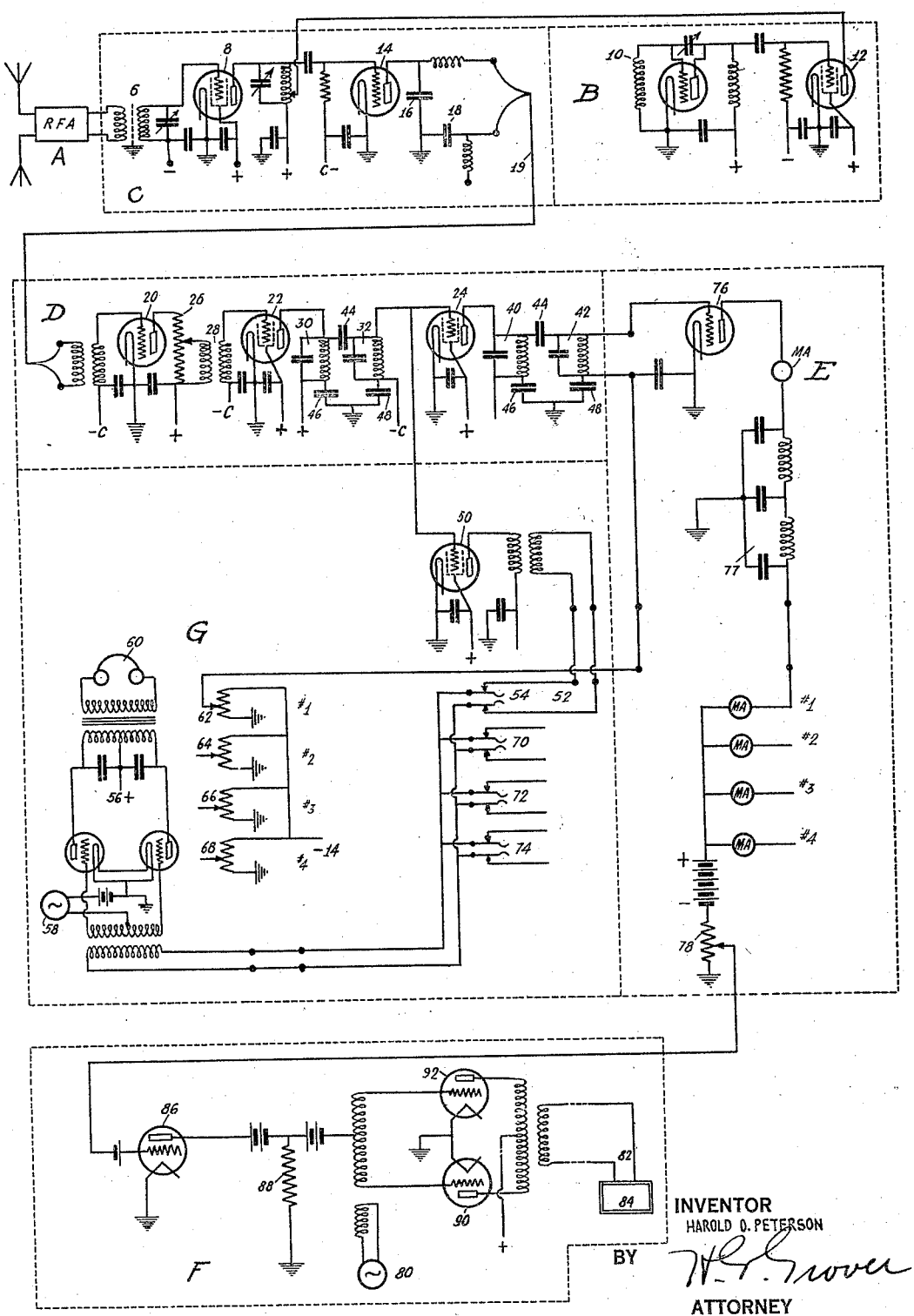

1,901,117

UNITED STATES PATENT OFFICE

HAROLD O. PETERSON, OF RIVERHEAD, LONG ISLAND, NEW YORK, ASSIGNOR TO RADIO CORPORATION OF AMERICA, A CORPORATION OF DELAWARE

RECEIVING SYSTEM

Application filed January 25, 1930. Serial No. 423,319.

In long distance radio transmission systems, at the receiver as is disclosed by Harold H. Beverage in his copending application Serial Number 405,615, filed November 8, 1929, energy is collected, amplified, rectified and in rectified form is utilized to control a working current, such as a low frequency alternating current, which is transmitted over a land line to a suitable translating device. As the rectified energy controls the transmission of the locally generated alternating current, it is desirable to monitor the received signal energy, that is to say, "listen in" in order to determine its strength; for, if the received signal energy falls, as it often does, below certain levels, when rectified it is not of sufficient strength to properly control the working current. To provide a monitoring system in connection with a receiving system is, therefore, the principal object of the present invention.

In order to monitor the received signal, the latter is split up into two portions, one of which is utilized for monitoring and the other for controlling the working current. If the monitoring energy is taken from the receiver circuits by means of electromagnetic or capacitive coupling devices, it will be found that the current flowing in those devices introduces reactionary effects which manifest themselves, usually, in detuning of the receiving apparatus. As this is highly objectionable, since it involves retuning of, often times, elaborate equipment, a further object of this invention is to provide monitoring apparatus which will be reactionless and hence when used will not affect tuning of the receiver. Briefly, this is accomplished by providing a monitoring system which utilizes potential variations and does not involve the flow of an appreciable current as is the case where reactive couplings are involved.

Further it is often desirable to heterodyne or beat down received high frequency signal energy to some lower intermediate frequency which is more easily handled. In ordinary heterodyne circuits, tuning of the intermediate frequency amplifier is rather sharp; hence, although the percentage of modulation of the received high frequency energy may be satisfactory, when transformed into lower or intermediate frequency energy the percentage modulation goes down, as the intermediate frequency circuits eliminate certain side bands thus causing this relative decrease in modulation and also distorting the received signal. According, a further object of my invention is to broaden the characteristic of the intermediate frequency circuits so that uniform amplification over a wider range of frequencies is obtainable thereby overcoming the foregoing disadvantage present in ordinary heterodyne outfits. In order to fulfill the foregoing object, I provide in the heterodyne circuits parallel tuned circuits which, I have found, give, by suitable choice of values for the electrical elements involved, a flat or uniform amplification characteristic over any predetermined band of frequencies.

And, a further object of my invention is to provide together with the combination of elements outlined above means for volume controlling the collected energy, as well as means to combine the rectified collected energies where a plurality of collecting antennæ are used and means to control a working current according to the combined rectified energies.

The features which characterize my invention are defined with particularity in the appended claims; but, my invention may best be understood by referring to the accompanying drawing which discloses a receiver embodying the features outlined above.

Referring to the drawing, high frequency signal energy is collected and amplified at A as disclosed in the referred to application of Harold H. Beverage.

Locally generated energy, locally generated by means of the apparatus shown within the dotted box B is combined or heterodyned at C with the received amplified energy to form energy of a lower intermediate frequency. The intermediate frequency or beat frequency energy is then fed to amplifying apparatus D, given a suitable uniform amplification characteristic over a predetermined band of frequencies so that there is no signal distortion during amplification of the intermediate frequency energy. The amplified intermediate frequency energy is rectified and combined with rectified energy, from similar geographically spaced antennæ, at rectifying and combining apparatus E. Numerals 2, 3, 4 indicate points at which other systems similar to the one so far outlined are connected to the combining apparatus. The combined rectified energies are then utilized to control the flow of a working current, in the form of a relatively low frequency alternating current, over a land line terminated by suitable translating apparatus.

The working current apparatus and translating apparatus are indicated at F. For monitoring and volume controlling the energy supplied by each antenna to the combining apparatus, monitoring and volume control apparatus G is provided.

To go into greater detail, energy from the radio frequency amplifier A is fed through an electrostatically shielded transformer 6 to a screen grid amplifier 8 the output circuit of which is also fed with energy from the local generator or oscillator 10 of any well known type. In order to prevent interaction between electron discharge device 8 and oscillator 10, the outputs of the two devices are coupled through a screen grid tube 12. This is more fully described in copending application Serial Number 327,802, filed December 22, 1928.

The amplified received energy and locally generated energy is then combined in detector 14 the high frequency component appearing in output of which is by-passed to ground by means of condenser 16. The intermediate frequency or relatively low frequency component appearing in the output circuit of detector 14 is fed through condenser 18 and lines 19 to the intermediate frequency amplifier apparatus at D.

Intermediate frequency of low value or amplitude is first amplified by vacuum tube 20 and is then increased to extremely higher values by the amplifying action of screen grid tubes 22, 24. By means of resistance 26 in the plate circuit of tube 20 and primary of transformer 28 variably shunted thereacross, the voltage applied to tube 22 may be easily controlled. This arrangement provides a more simple mechanical arrangement for obtaining a variable voltage than does the use of variable transformer taps.

In order to broaden the characteristic of the intermediate frequency amplifier apparatus, as the intermediate frequency energy becomes of higher value, I successively couple electron discharge devices 22, 24 by means of parallel tuned circuits 30, 32 and 40, 42, the latter of which couple tube 24 to the rectifier and combining apparatus E. Condensers 44, 46, 48 serve, of course, as intermediate frequency by-passing elements.

Each of the paralleled tuned circuits has a sharp resonant point but, when paralleled with another similar circuit, the characteristic curves merge to provide an amplification curve which is flat or uniform over a predetermined range of frequencies depending upon, of course, the frequencies to which the circuits are tuned. The flatness may be further enhanced by inserting resistances, either lumped or distributed, into the tuned circuits. In this way any tendency for the intermediate frequency amplifier circuits to cut off side bands of the intermediate frequency energy is eliminated.

For monitoring; or, in other words, to determine the strength and quality of the signal collected on each antenna, it is possible, of course, to electromagnetically or electrostatically couple monitoring apparatus to the intermediate frequency amplifier apparatus. However, such coupling would tend to detune the apparatus; and, to avoid this, I provide a reactionless coupling for my monitoring apparatus. More specifically, this takes the form of a conductive connection from a control electrode of tube 24 to a similar electrode of monitor tube 50 of screen grid type. Energy of intermediate frequency appearing in the output of device 50 is fed through lines 52 and plug-in jacks 54 to a monitoring detector 56 supplied in carrier suppression form with undulating energy from a local source 58. The beat resulting from the intermediate frequency energy and the energy generated at 58 manifests itself in telephones or any other suitable indicating device 60.

If the monitor beat which indicates the strength of the received signal and heterodyned energy, appears too strong or too weak, by means of a manual volume control resistance 26, the voltage applied to the input side of the intermediate amplifier may readily be controlled.

The volume of the output of the signal is further indicated at rectified current metering point MA #1, MA #2 etc. Furthermore, the meter MA #1 facilitates the proper adjustment of detector bias by potentiometer 62.

The volume control need not be limited to the circuit shown, but may be applied to the control electrodes or anodes of the radio frequency amplifiers or to the control grids or electrodes of the other intermediate frequency amplifiers. Further, it may be applied to control electrode voltages on coupling tube 12; or, it may be applied to control electrode voltages on any or all of the tubes forming the part of the system so far described in detail.

Volume control apparatus 64, 66 and 68 together with independent jacks 70, 72, 74 are shown to indicate the manner in which similar systems may be coupled together to form a complete diversity receiving system wherein, in order to reduce fading effects, a plurality of geographically separated antennæ are utilized.

The output of intermediate frequency amplifier apparatus D is fed to a rectifier 76 in the output circuit of which is a low pass filter 77 which passes the signal component appearing in the supplied rectified heterodyned energy and by-passes energy of heterodyned frequency. The low frequency signal energy is fed and combined in resistance 78 with rectified signal energy derived from other antennæ systems. Connection of the other systems is made as already indicated at points 2, 3 and 4.

Voltages appearing across resistance 78 due to the combined rectified signal energies control the presence of a local undulatory energy or working current generated by a generator 80, on land lines 82 which feed it to a conveniently located translating device 84. Normally in the absence of signal energy tube 86 is allowed to draw current but, in the presence of a signal energy it is biased to cut off. When biased to cut off, since there is no plate current flowing in tube 86, there is no voltage drop across resistance 88 and as a result, the negative bias on pushpull arranged tubes 90, 92 is decreased allowing the presence of current in land lines 82. In the absence of signal, the negative bias of tubes 92, 90 is increased to cut off thereby precluding the presence of low frequency working or signal current on land lines 82.

Of course, for reverse signalling, by resistively cascading with tube 86 another tube similar to it in the presence of signal energy in resistance 78, no energy appears in land lines 82 and vice versa.

Having thus described my invention what I claim is:

1. In combination, an antenna; means for amplifying the energy collected by the antenna; reactionless monitoring means for determining the strength of the amplified energy, said reactionless monitoring means comprising an electron discharge device having a control electrode, and a substantially non-reactive path connecting said control electrode to said amplifying means; means for rectifying the amplified energy; and, means for translating the rectified energy.

2. In combination, a plurality of antennæ, an amplifier associated with each antenna for amplifying the energy collected thereon; reactionless monitoring means for determining the strength of the energy collected on each antenna, said reactionless monitoring means comprising an electron discharge device having a control electrode, and a substantially non-reactive path connecting said control electrode to said amplifying means; means for rectifying the amplified energies; and, means for translating the rectified energies.

3. In combination, an antenna; means for amplifying the energy collected by the antenna; means for heterodyning the amplified energy; reactionles monitoring means for determining the strength of the heterodyned energy, said reactionless monitoring means comprising an electron discharge device having a control electrode, and a substantially non-reactive path for connecting said control electrode to an output circuit of said heterodyning means; and, means for translating the heterodyned energy.

4. In combination, a plurality of antennæ; an amplifier associated with each antenna for amplifying the energy collected thereon; means for heterodyning the amplified energies; reactionless monitoring means for determining the strength of the heterodyned energies, said reactionless monitoring means comprising an electron discharge device having a control electrode, and a substantially non-reactive path for connecting said control electrode to an output circuit of said heterodyning means; means for rectifying the heterodyned energies; means for combining the rectified energies; and, means for translating the combined energy.

5. In combination, an antenna; means for amplifying the energy collected by the antenna; reactionless monitoring means for determining the strength of the amplified energy, said reactionless monitoring means comprising an electron discharge device having a control electrode, and a substantially non-reactive path connecting said control electrode to said amplifying means; means for volume controlling the amplified energy; means for rectifying the volume controlled energy; and, means for translating the rectified energy.

6. In combination, a plurality of antennæ; an amplifier associated with each antenna for amplifying the energy collected thereon; reactionless monitoring means for determining the strength of the energy collected on each antenna, said reactionless monitoring means comprising an electron discharge device having a control electrode, and a substantially non-reactive path connecting said control electrode to said amplifying means; means for volume controlling the amplified energies; means for rectifying the volume controlled energies; and, means for translating the rectified energies.

7. In combination, an antenna; means for amplifying the energy collected by the antenna; means for heterodyning the amplified energy; reactionless monitoring means for determining the strength of the heterodyned energy, said reactionless monitoring means comprising an electron discharge device having a control electrode, and a substantially non-reactive path for connecting said control electrode to an output circuit of said heterodyning means; means for volume controlling the heterodyned energy; and, means for translating the volume controlled energy.

8. In combination, a plurality of antennæ; an amplifier associated with each antenna for amplifying the energy collected thereon; means for heterodyning the amplified energies; reactionless monitoring means for determining the strength of the heterodyned energies, said reactionless monitoring means comprising an electron discharge device having a control electrode, and a substantially non-reactive path for connecting said control electrode to an output circuit of said heterodyning means; means for volume controlling the heterodyned energies; means for rectifying the volume controlled energies; means for combining the rectified energies; and, means for translating the combined energies.

9. In combination, a plurality of antennæ; an amplifier associated with each antenna for amplifying the energy collected thereon; means for heterodyning the amplified energies; reactionless monitoring means for determining the strength of the heterodyned energies, said reactionless monitoring means comprising an electron discharge device having a control electrode, and a substantially non-reactive path for connecting said control electrode to an output circuit of said heterodyning means; means for rectifying the heterodyned energies; means for volume controlling the rectifying means; means for combining the volume controlled rectified energies; and means for translating the combined energy.

10. In combination, a plurality of antennæ; an amplifier associated with each antenna for amplifying the energy collected thereon; reactionless monitoring means for determining the strength of the energy collected on each antenna, said reactionless monitoring means comprising an electron discharge device having a control electrode, and a substantially non-reactive path connecting said control electrode to said amplifying means; means for rectifying the amplified energies; means for volume controlling the rectifying means, means for combining the rectified energies; and, means for utilizing the combined volume controlled rectified energies to control a working current.

11. In combination, an antenna; means for amplifying the energy collected by the antenna; means for heterodyning the amplified energy; reactionless monitoring means for determining the strength of the heterodyned energy, said reactionless monitoring means comprising an electron discharge device having a control electrode, and a substantially non-reactive path for connecting said control electrode to an output circuit of said heterodyning means; means for volume controlling the heterodyned energy; and means, for utilizing the volume controlled heterodyned energy, to control the flow of a working current.

12. In combination, a plurality of antennæ; an amplifier associated with each antenna for amplifying the energy collected thereon; reactionless monitoring means for determining the strength of the energy collected on each antenna, said reactionless monitoring means comprising an electron discharge device having a control electrode, and a substantially non-reactive path connecting said control electrode to said amplifying means; means for heterodyning the amplified energies; means comprising parallel tuned circuits to amplify uniformly, over a predetermined frequency range, the heterodyned energy, means for rectifying the heterodyned energies; and, means for translating the rectified energies.

13. In combination, a plurality of antennæ; and amplifier associated with each antenna for amplifying the energy collected thereon; means for heterodyning the amplified energies; means, comprising parallel tuned circuits, for amplifying uniformly, over a predetermined frequency range, the heterodyned energy; reactionless monitoring means for determining the strength of the heterodyned energies, said reactionless monitoring means comprising an electron discharge device having a control electrode, and a substantially non-reactive path for connecting said control electrode to an output circuit of said heterodyning means; means for rectifying the heterodyned energies; means for combining the rectified energies; and means for translating the combined energies.

HAROLD O. PETERSON.